US010681572B2

(12) United States Patent
Bostick et al.

(10) Patent No.: US 10,681,572 B2
(45) Date of Patent: Jun. 9, 2020

(54) DYNAMIC BANDWIDTH ANALYSIS FOR MOBILE DEVICES

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

(21) Appl. No.: 15/473,674

(22) Filed: Mar. 30, 2017

(65) Prior Publication Data
US 2018/0288776 A1    Oct. 4, 2018

(51) Int. Cl.
*H04W 24/08*    (2009.01)
*H04W 28/20*    (2009.01)
(Continued)

(52) U.S. Cl.
CPC ........... *H04W 24/08* (2013.01); *H04W 28/20* (2013.01); *H04L 43/0894* (2013.01); *H04L 43/16* (2013.01);
(Continued)

(58) Field of Classification Search
None
See application file for complete search history.

(56) References Cited

U.S. PATENT DOCUMENTS 5,901,205 A    5/1999   Smith et al.
7,746,897 B2   6/2010   Stephenson et al.
(Continued)

OTHER PUBLICATIONS

List of IBM Patents or Patent Applications Treated as Related 1 page.

(Continued)

*Primary Examiner* — Christopher M Crutchfield
*Assistant Examiner* — Alan L Lindenbaum
(74) *Attorney, Agent, or Firm* — James Nock; Andrew D. Wright; Roberts Calderon Safran & Cole, P.C.

(57) ABSTRACT

A computer program product includes: a computer readable storage medium having program instructions embodied therewith. The program instructions are executable by a mobile computer device to cause the mobile computer device to: determine a bandwidth allocation crosses a threshold; determine availability of another network based on the bandwidth allocation crossing the threshold; retrieve information from data sources internal to and external from the mobile computer device based on the bandwidth allocation crossing the threshold; perform a priority bandwidth assessment on the information from the data sources based on retrieving the information; determine an assignment of priority bandwidth allocation based on an analysis of the priority bandwidth assessment of the information from the data sources; transmit a request for a grant of the assignment of priority bandwidth allocation; receive the grant of the assignment of priority bandwidth allocation; and assign the priority bandwidth allocation based on receiving the grant.

10 Claims, 3 Drawing Sheets

(51) Int. Cl.
*H04L 12/26* (2006.01)
*H04W 72/04* (2009.01)

(52) U.S. Cl.
CPC ...... *H04W 72/048* (2013.01); *H04W 72/0453* (2013.01)

(56) References Cited

U.S. PATENT DOCUMENTS

| | | | |
|---|---|---|---|
| 8,681,709 B2 | 3/2014 | Sennett et al. | |
| 8,868,025 B2 | 10/2014 | Ganesh et al. | |
| 9,558,263 B2 | 1/2017 | Visotski et al. | |
| 2003/0112784 A1 | 6/2003 | Lohtia et al. | |
| 2004/0044770 A1 | 3/2004 | Messick et al. | |
| 2009/0247204 A1* | 10/2009 | Sennett | H04W 16/14 455/512 |
| 2012/0189016 A1* | 7/2012 | Bakker | H04W 76/11 370/401 |
| 2013/0035107 A1* | 2/2013 | Chan | H04W 28/20 455/453 |
| 2013/0342346 A1* | 12/2013 | Hazzani | G08B 23/00 340/539.13 |
| 2014/0280314 A1 | 9/2014 | Coleman et al. | |
| 2015/0039690 A1* | 2/2015 | Jackson | G06F 15/17306 709/204 |
| 2015/0356404 A1 | 12/2015 | Sanchez et al. | |
| 2016/0162588 A1 | 6/2016 | Tuchman et al. | |
| 2016/0203217 A1 | 7/2016 | Anisingaraju et al. | |
| 2017/0039275 A1 | 2/2017 | Akolkar et al. | |

OTHER PUBLICATIONS

Specification "Dynamic Bandwidth Analysis for Mobile Devices" and Drawings in U.S. Appl. No. 15/845,092, filed Dec. 18, 2017, 35 pages.
Offfice Action in related U.S. Appl. No. 15/845,092 dated Feb. 13, 2019, 15 pages.
Ahmed, "A Deep Dive on Relationship Extraction", IBM Government Industry Blog, Jun. 3, 2016, 6 pages.
Ahmed, "Cognitive Visual Recognition", IBM Government Industry Blog, Feb. 16, 2016, 5 pages.
Becker, "IBM Watson: Building a Cognitive App with Concept Insights", Primary Objects, Feb. 1, 2016, 29 pages.
Cohn et al., "Automated Face Analysis for Affective Computing", OUP Uncorrected Proof—Firstproofs Newgen, Jul. 18, 2014, 20 pages.
Dinges et al., "Optical Computer Recognition of Facial Expressions Associated with Stress Induced by Performance Demands", Aviation, Space, and Environmental Medicine, vol. 76, No. 6, Section II, Jun. 2005, 11 pages.
Kulkarni et al., "BioMedical Engineering OnLine", BioMed Central, Aug. 5, 2009, http://www.biomedical-engineering-online.com/content/8/1/16, 12 pages.
Shin, "Facial Expression Recognition Based on Dimension Model Using Sparse Coding", ICCS, 2004, 8 pages.
Sinha, "Tone check your communication with Watson", Watson, Feb. 22, 2016, 8 pages.
Anonymous, "Connect Better with Customers by Using Small Data Found on Social Media", EnsembleIQ, Sep. 29, 2016, 6 pages.
Final Office Action in related U.S. Appl. No. 15/845,092 dated May 31, 2019, 19 pages.
Office Action in related U.S. Appl. No. 15/845,092 dated Nov. 7, 2019, 30 pages.
Notice of Allowance in related U.S. Appl. No. 15/845,092 dated Mar. 5, 2020, 10 pages.

\* cited by examiner

DYNAMIC BANDWIDTH ANALYSIS FOR MOBILE DEVICES

BACKGROUND

The present invention relates generally to network bandwidth allocation and, more particularly, to systems and methods for the management of network priority bandwidth improvements to mobile devices based on situational factors of a network subscriber.

Mobile device network providers often implement artificial network bandwidth limits for business purposes. These bandwidth limits restrict a user's access to the network of the service provider, and may include mechanisms such as data caps, throttling of bandwidth, tiered network offerings, and different types of data networks. These limitations are not technical limits of the network, but are limitations that are artificially placed on the network devices of the network subscriber. This allows for multiple pricing structures and business models for both the network provider and the network subscriber.

Typically, to overcome such artificial limits, a network subscriber may select different network plans which allow for different levels of access to the network of a service provider. For example, the network subscriber may buy a network plan from the service provider which has different pricing levels. As the price of a network plan increases, the level of access to the network of the service provider also increases. In another example, the network subscriber may only buy a network plan that provides access on a 3G network of the service provider and not the Long Term Evolution (LTE) network of the service provider, even though a mobile device may be able to access the LTE network of the service provider.

SUMMARY

In an aspect of the invention, there is a computer implemented method that includes: determining, by a mobile computer device, a bandwidth allocation crosses a threshold; retrieving, by the mobile computer device, information from data sources internal to and external from the mobile computer device based on the bandwidth allocation crossing the threshold; performing, by the mobile computer device, a priority bandwidth assessment on the information from the data sources based on retrieving the information; determining, by the mobile computer device, an assignment of priority bandwidth allocation based on an analysis of the priority bandwidth assessment of the information from the data sources; transmitting, by the mobile computer device, a request for a grant of the assignment of priority bandwidth allocation; receiving, by the mobile computer device, the grant of the assignment of priority bandwidth allocation; and assigning, by the mobile computer device, the priority bandwidth allocation based on receiving the grant.

In another aspect of the invention, there is a computer program product comprising a computer readable storage medium having program instructions embodied therewith. The program instructions are executable by a mobile computer device to cause the mobile computer device to: determine a bandwidth allocation crosses a threshold; determine availability of another network based on the bandwidth allocation crossing the threshold; retrieve information from data sources internal to and external from the mobile computer device based on the bandwidth allocation crossing the threshold; perform a priority bandwidth assessment on the information from the data sources based on retrieving the information; determine an assignment of priority bandwidth allocation based on an analysis of the priority bandwidth assessment of the information from the data sources; transmit a request for a grant of the assignment of priority bandwidth allocation; receive the grant of the assignment of priority bandwidth allocation; and assign the priority bandwidth allocation based on receiving the grant In another aspect of the invention, there is a system comprising: a CPU, a computer readable memory and a computer readable storage medium associated with a mobile computer device; program instructions to determine a bandwidth allocation for a mobile computer device crosses a threshold; program instructions to determine availability of another network for the mobile computer device based on the bandwidth allocation for the mobile computer device crossing the threshold; program instructions to retrieve information from data sources internal to and external from the mobile computer device based on the bandwidth allocation crossing the threshold; program instructions to perform a priority bandwidth assessment on the information from the data sources based on retrieving the information; program instructions to determine an assignment of priority bandwidth allocation to the mobile computer device based on an analysis of the priority bandwidth assessment of the information from the data sources; program instructions to transmit a request for a grant of the assignment of priority bandwidth allocation; program instructions to receive the grant of the assignment of priority bandwidth allocation; and program instructions to assign the priority bandwidth allocation to the mobile computer device based on receiving the grant. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to network bandwidth allocation and, more particularly, to systems and methods for the management of network priority bandwidth improvements to mobile devices based on situational factors of a network subscriber. Embodiments of the invention recognize that, in certain situations, a network subscriber may benefit from temporary modification (e.g., removal) of artificial network bandwidth limits such as data caps, throttling, tiered network offerings, and different types of data networks. Aspects of the invention are directed to systems and methods for dynamically and temporarily modifying artificial network bandwidth limits that apply to a network subscriber, wherein the modifying is based on cognitive analysis of data sources associated with the network subscriber.

In embodiments, as situations arise in which artificial limitations placed on the mobile device of the network subscriber become detrimental to the utility of the network subscriber and, possibly, to the reputation of the network provider, temporary removal of the artificial limitations on network access may be provided. For example, during an emergency situation, such as severe weather, natural disasters, or manmade disasters, the network subscriber may use his mobile device to attempt to contact an emergency responder and/or public safety officer to respond to the situation. In such emergencies that affect multiple people in a given area, restrictions on the network access of the mobile device of the network subscriber may be temporarily removed to provide increased utility to the network subscriber until resolution of the situation.

In aspects, the system may determine that the bandwidth allocation for the mobile device crosses a bandwidth allocation threshold and may determine availability of a faster or less congested network for the mobile device. In aspects, the system may retrieve information from data sources and, based on a priority bandwidth assessment of the information, the system may determine the mobile device warrants an assignment of priority bandwidth allocation.

In aspects, the system may determine the assignment of priority bandwidth allocation to the mobile device based on a cognitive analysis. For example, the cognitive analysis may utilize natural language processing, relationship extraction processing, tone analysis processing, and visual recognition processing which generates insights, confidence level of the insights, and severity levels of the insights of the situation of the network subscriber.

In other aspects, the system may transmit a request for a grant of the assignment of priority bandwidth allocation to a service provider server. In aspects, the service provider server may analyze the request for the grant and may determine to grant the assignment of priority bandwidth allocation. In other aspects, the system may assign the priority bandwidth allocation to the mobile device based on receiving the grant of priority bandwidth allocation from the service provider server.

In aspects, the priority bandwidth allocation available for the mobile device may be limited to a subset of mobile software applications within the mobile device. In embodiments, the priority bandwidth allocation includes switching from a default wireless network channel of the mobile device to a wireless network channel that is capable of transferring data at a high-speed rate.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
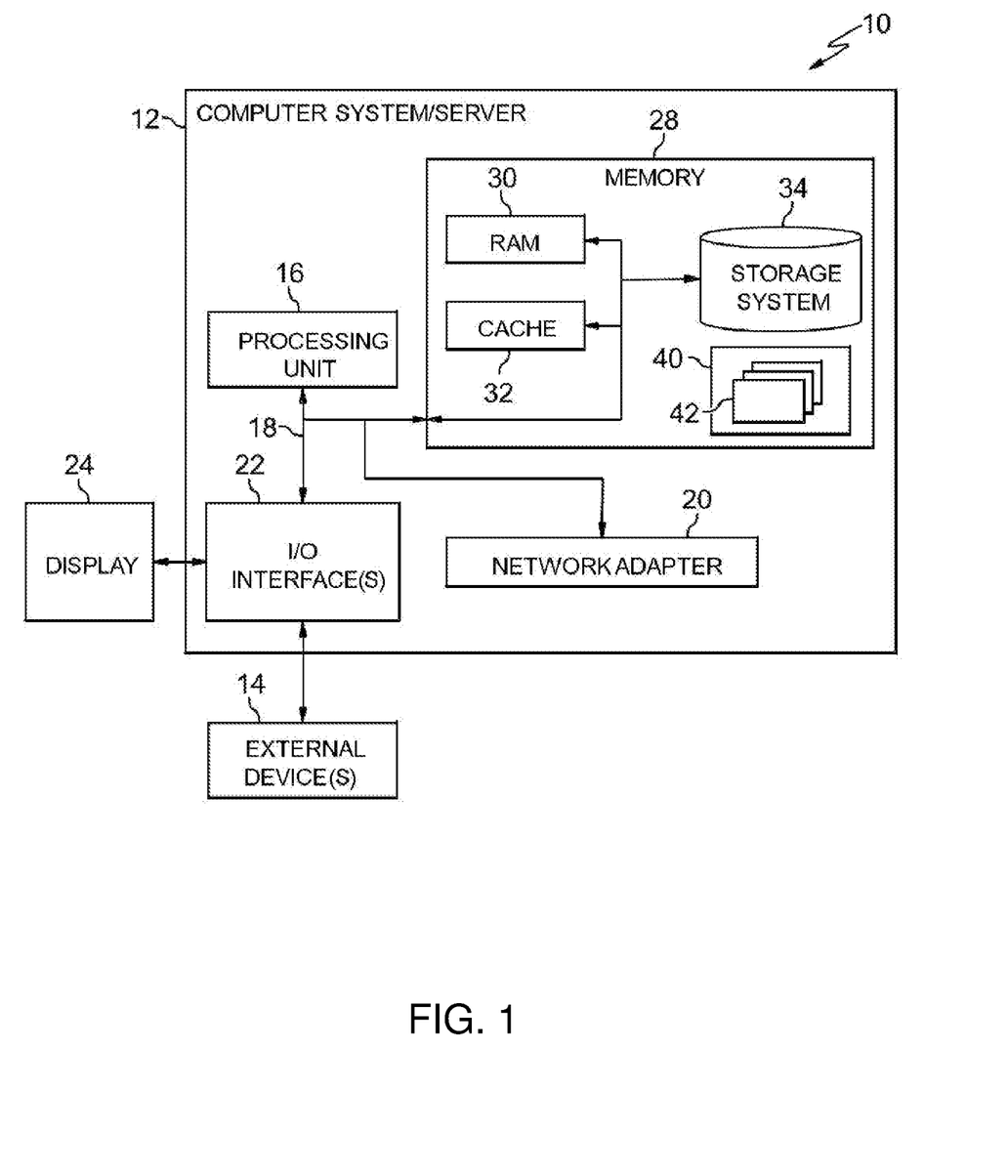
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
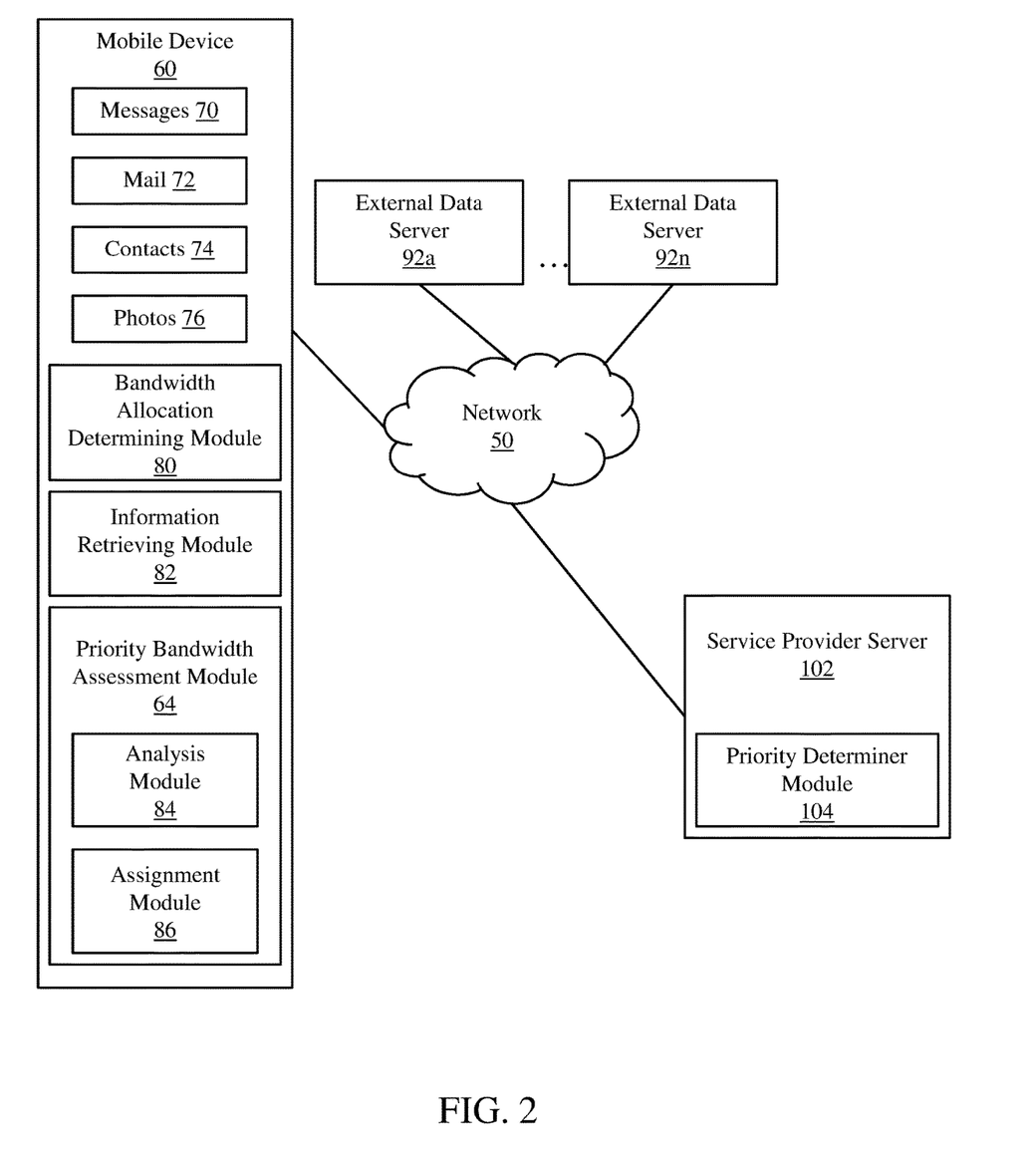
FIG. 2 shows an exemplary environment in accordance with aspects of the invention.

FIG. 2 shows an exemplary environment in accordance with aspects of the invention. The environment includes a mobile device 60 connected to a network 50 (e.g., via the network adapter 20 of FIG. 1). The network 50 may be any suitable communication network or combination of networks, such as a local area network (LAN), a general wide area network (WAN), a public network (e.g., the Internet), a 3G network, a Long-Term Evolution (LTE) network, and/or a 5G network.

In embodiments, the mobile device 60 is in communication with one or more external data servers 92a-n and service provider server 102 over the network 50. The external data servers 92a-n may include one or more components of a computer system similar to the computer system 12 of FIG. 1, to store and process data. In embodiments, each of the external data servers 92a-n may be a general purpose computing device, such as a desktop computer, laptop computer, tablet computer, smartphone, etc. In aspects, the external data servers 92a-n are represented as external data server 92a to external data server 92n, where n may be any appropriate number of separate external data servers that provide data to the service provider server 102 and/or the mobile device 60.

In aspects, the external data servers 92a-n may provide information to the mobile device 60 over the network 50. For example, the external data server 92a may be a data server at a weather station and may provide weather information to the mobile device 60. The external server 92n may be a data server at a news station and may provide newsfeeds to the mobile device 60. Other types of external data servers, such as traffic data servers and social network servers, may also provide essential information to the mobile device 60. The external data servers 92a-n may be local, national, or worldwide servers that provide information to the mobile device 60 such as a severe weather event occurring or about to occur in the vicinity of the network subscriber, unexpected news events occurring or about to occur in the vicinity of the network subscriber, emergency traffic situations occurring or about to occur in the vicinity of the network subscriber, or emergency information regarding friends and family of the network subscriber.

Still referring to FIG. 2, the service provider server 102 may include one or more components of a computer system similar to the computer system 12 of FIG. 1 that communicate with the mobile device 60 over the network 50. The service provider server 102 may be operated by the network provider of the network 50 (e.g., LTE, 3G) subscribed to by the mobile device 60. In aspects, the service provider server 102 in FIG. 2 may include a priority determiner module 104, which may be similar to the program modules 42 in FIG. 1, configured to carry out the functions and/or methodologies of embodiments of the invention as described herein. In aspects, the priority determiner module 104 is configured to grant a request for the assignment of priority bandwidth allocation.

In aspects, the mobile device 60 may include one or more components of a computer system similar to the computer system 12 of FIG. 1, to store and process information in a memory similar to memory 28 of FIG. 1. In embodiments, the mobile device 60 may be a network subscriber's computer device, such as a laptop computer, smartphone, tablet, or another mobile device that has the ability to communicate with the external data servers 92a-n and the service provider server 102 over the network 50. In embodiments, the mobile device 60 may include additional or fewer components than those shown in FIG. 2. In embodiments, separate components may be integrated into a single computing component or module. Additionally, or alternatively, a single component may be implemented as multiple computing components or modules.

In aspects, the mobile device 60 includes internal or local data sources which may include messages 70, mail 72, contacts 74, and photos 76. The messages 70 may include SMS messages received and sent by the mobile device 60. The mail 72 may include email messages received and sent by the mobile device 60. The contacts 74 may include the contact list of the network subscriber stored on the mobile device 60, which may also include a user identified relationship of the contact to the network subscriber. The photos 76 may include pictures taken by, and stored on, the mobile device 60. In aspects, the data sources may include other types of data sources stored on the mobile device 60.

In embodiments, the mobile device 60 includes a bandwidth allocation determining module 80 configured to determine the bandwidth allocation of the mobile device 60, an information retrieving module 82 configured to retrieve information from the data sources 70, 72, 74, 76 and external data servers 92a-n, a priority bandwidth assessment module 64 configured for assessing the assignment of priority bandwidth allocation to the mobile device 60, an analysis module 84 configured to analyze the information from the data sources 70, 72, 74, 76 and external data servers 92a-n, and an assignment module 86 configured to assign the priority bandwidth allocation to the mobile device 60.

The priority bandwidth assessment module 64 is a component of the mobile device 60, either built in to the operating system or available as a stand-alone application on the mobile device 60. The priority bandwidth assessment module 64 may determine that a situation warrants an assignment of priority bandwidth allocation by analyzing information from data sources 70, 72, 74, 76 on the mobile device 60 and information from external data servers 92a-n.

In accordance with aspects of the invention, the bandwidth allocation determining module 80 is configured to determine the usage of bandwidth allocation for the mobile device 60 crosses a threshold. For example, the bandwidth allocation determining module 80 may monitor the usage of bandwidth allocation of the mobile device 60 and may determine that the usage of bandwidth allocation of the mobile device 60 crossed the threshold. Sources for determining that the usage of bandwidth allocation crosses the threshold may include the subscriber plan of the network subscriber, the data usage of the network subscriber, and the current location of the network subscriber.

In aspects, based on determining that the usage of bandwidth allocation crossed the threshold, the bandwidth allocation determining module 80 may be configured to determine availability of a high-speed or less congested network for the mobile device 60. Sources for determining availability of the high-speed or less congested network for the mobile device 60 may include availability of data networks of network providers other than the network provider of the mobile device 60, availability of data networks at the location of the mobile device 60, and bandwidth availability and speeds of the data networks in the location of the mobile device 60.

In accordance with aspects of the invention, based on determining that the usage of bandwidth allocation crosses the threshold and determining the availability of the high-speed or less congested network, the information retrieving module 82 may retrieve information from the data sources 70, 72, 74, 76 and may retrieve information from the external data servers 92*a-n*.

In aspects, based on retrieving information from the data sources 70, 72, 74, and information from the external data server 92*a-n*, the priority bandwidth assessment module 64 may perform a high-level analysis of the information on the data sources 70, 72, 74, 76 and the external data servers 92*a-n* to determine that the situation of the network subscriber of the mobile device 60 may warrant an assignment of priority bandwidth allocation. For example, the priority bandwidth assessment module 64 may perform a high-level analysis of the information from the data sources 70, 72, 74, 76 to determine that a family emergency is occurring which may warrant an assignment of priority bandwidth allocation to the mobile device 60. In another example, the priority bandwidth assessment module 64 may perform a high-level analysis of information from external data servers 92*a-n* to determine that a weather emergency is occurring near the mobile device 60 which may warrant an assignment of priority bandwidth allocation.

In accordance with aspects of the invention, based on determining that the situation of the network subscriber warrants the assignment of priority bandwidth allocation, the analysis module 84 may perform a cognitive analysis of the information received from the data sources 70, 72, 74, 76 and the information received from the external data servers 92*a-n*. In aspects, the cognitive analysis includes natural language processing, relationship extraction processing, tone analysis processing, and visual recognition processing which may aid the priority bandwidth assessment module 64 in determining that the mobile device 60 warrants the assignment of priority bandwidth allocation.

For example, the analysis module 84 may utilize natural language processing on the information from each of the data sources 70, 72, 74, 76 and the external data servers 92*a-n* to extract meaning from unstructured text. In aspects, as the information in SMS messages, email, and social postings is in unstructured text, natural language processing of the unstructured text aids in determining the situation of the network subscriber.

In another example, the analysis module 84 may utilize relationship extraction processing on the information from each data sources 70, 72, 74, 76 and the external data servers 92*a-n* to perform linguistic analysis of the text of the information. In aspects, if news data is retrieved by the information retrieving module 82, the text of the news data is analyzed to determine that the news is valued by the network subscriber or an emergency is occurring near the network subscriber.

In another example, the analysis module 84 may utilize tone analysis processing on the information from each data sources 70, 72, 74, 76 and the external data servers 92*a-n* to detect the tone used in a written communication on the mobile device 60. In aspects, tone analysis processing may be used to detect and interpret emotional writing clues found in the text of short message service (SMS) messages, email, and social postings of the network subscriber. The emotional writing clues may include emoticons or certain punctuation that indicates the emotional state of the network subscriber and aids in determining the situation of the network subscriber.

In yet another example, the analysis module 84 may utilize visual recognition processing on the information from each data sources 70, 72, 74, 76 and the external data servers 92*a-n* to understand the content of images on the mobile device 60. In aspects, visual recognition processing may be used to understand the content of images retrieved by the information retrieving module 82 such as a photo of someone in a distressed state.

In aspects, based on the cognitive analysis of the information from data sources 70, 72, 74, 76 and the external data servers 92*a-n* individually and in aggregate, the analysis module 84 may generate an insight, confidence level of the insight, and severity levels of the insight of the situation of the network subscriber. An insight may be an understanding of the nature of the situation of the network subscriber. The confidence level of the insight determines the accuracy of the insight based upon the source of the information used to determine the insight. The severity level determines the seriousness of the situation described in the insight as the insight relates to the assignment of priority bandwidth allocation to the mobile device 60.

In an example, the analysis module 84 may generate an insight of an emergency (e.g., a small scale snowstorm) currently underway or imminent to the location of the mobile device 60 based on the cognitive analysis. In aspects, based on the generation of insight of a small scale snowstorm, the analysis module 84 may determine the confidence level of the emergency as high based on the source of the information coming from a local weather data server. In aspects, based on the generation of insight of a small scale snowstorm, the analysis module 84 may determine the severity level of the emergency as low based on the size of the snow storm and may determine the severity level of the snow storm does not warrant the assignment of priority bandwidth allocation.

In another example, the analysis module 84 may generate an insight of an emergency (e.g., a large scale traffic accident) currently underway or imminent to the location of the mobile device 60 based on the cognitive analysis. In aspects, based on the generation of insight of a large scale traffic accident, the analysis module 84 may determine the confidence level of the traffic accident as medium based on the source of the information coming from a national traffic data server. In aspects, based on the generation of insight of a large scale traffic accident, the analysis module 84 may determine the severity level of the traffic accident as high based on the large size of the traffic accident and may determine the severity level of the traffic accident warrants the assignment of priority bandwidth allocation.

In another example, the analysis module 84 may generate an insight regarding a remote location from the network subscriber but that relates to or affects the network subscriber based on the cognitive analysis. In aspects, based on the cognitive analysis of the contacts 74, which may determine the family members of the network subscriber, and the external data server 92*a*, which may be a weather data server at the location of the family member of the network subscriber, the analysis module 84 may generate an insight of a severe weather pattern occurring near the family member of the network subscriber. In aspects, based on the generation of insight of the severe weather pattern occurring near the family member of the network subscriber, the analysis module 84 may determine the confidence level of the weather pattern and the severity level of the weather pattern.

In another example, the analysis module 84 may generate an insight of a natural disaster that has occurred in a location the network subscriber has recently visited based on the cognitive analysis of the recent photos 76 on the mobile device 60 and the recent messages 70 on the mobile device 60. In aspects, based on the generation of insight that a natural disaster has occurred in a location the network subscriber has recently visited, the analysis module 84 may determine the confidence level of the natural disaster and the severity level of the natural disaster.

In another example, the analysis module 84 may generate an insight regarding a medical emergency affecting the network subscriber to which the network subscriber must respond. In aspects, the cognitive analysis contacts 74 may determine the names of the parents of the network subscriber and a cognitive analysis of messages 70 may determine that a serious medical situation has occurred to one of the family based on natural language processing and tone analysis processing of the messages 70. In aspects, based on the generation of the insight regarding a medical emergency affecting the network subscriber, the analysis module 84 may determine the confidence level of the medical emergency and the severity level of the medical emergency.

In accordance with aspects of the invention, based on the analysis module 84 generating an insight, confidence level of the insight, and severity levels of the insight, the priority bandwidth assessment module 64 may transmit a request for the grant of the assignment of priority bandwidth allocation along with the insight, the confidence level of the insight, and the severity level of the insight to the service provider server 102. In aspects, the priority bandwidth assessment module 64 determines the request for the grant of the assignment of priority bandwidth allocation to the mobile device 60 based on unrestricted access, restricted access by application type, and restricted access by application usage.

In aspects, unrestricted access includes unrestricted access to additional bandwidth or unrestricted access to a faster network for all applications on the mobile device 60. In aspects, restricted access by application type includes restricted access to additional bandwidth or restricted access to a faster network for a specific application on the mobile device 60. For example, based on the insight relating to a medical emergency of a family member overseas, the request for the assignment of priority bandwidth allocation may be a request for a particular video chat application but not for other online applications.

In aspects, restricted access by application usage includes a specific usage of a specific application on the mobile device 60. For example, based on the insight relating to a medical emergency of a family member overseas, the request for the assignment of priority bandwidth allocation may be a request for using the video chat application with certain individuals in the contacts 74, such as family members, but not other individuals in the contacts 74, such as coworkers, during the length of the medical emergency.

In accordance with aspects of the invention, the priority determiner module 104 may analyze the request for the grant of the assignment of priority bandwidth allocation from the priority bandwidth assessment module 64 to determine granting the request for the assignment of priority bandwidth allocation. In aspects, the priority determiner module 104 may analyze the insight, the confidence level of the insight, and the severity level of the insight based on algorithmic rules to determine granting the request for the assignment of priority bandwidth allocation. For example, the priority determiner module 104 may determine to grant the request for the assignment of priority bandwidth allocation based on a small chance that a situation warrants the assignment of priority bandwidth allocation. In another example, the priority determiner module 104 may determine to grant the request for the assignment of priority bandwidth allocation based on both the confidence level and severity level of the insight as high. In yet another example, the priority determiner module 104 may determine to grant the assignment of priority bandwidth allocation on the basis that the confidence level of the insight is medium but the severity level of the insight is high.

In aspects, the priority determiner module 104 may determine a length of time of the grant of the assignment of priority bandwidth allocation based on analysis of the request, the insight, the confidence level of the insight, and the severity level of the insight. In aspects, the algorithmic rules that determine granting the request of the assignment of priority bandwidth allocation and the length of time of the grant may be customizable by the service provider server 102. In aspects, the grant of the assignment of priority bandwidth allocation includes removing data cap bandwidth throttling or allowing the mobile device 60 access to a high-speed network (e.g., transferring from a 3G network to an LTE network).

In accordance with aspects of the invention, based on the priority determiner module 104 determining the grant of the assignment of priority bandwidth allocation, the assignment module 86 receives the grant of the assignment of priority bandwidth allocation from the service provider server 102. In aspects, based on receiving the grant, the assignment module 86 assigns the assignment of priority bandwidth allocation to the mobile device 60. In aspects, the priority bandwidth allocation module 64 regulates the assignment of the priority bandwidth allocation based on unrestricted access, restricted access by application type, and restricted access by application usage. In aspects, if the network subscriber attempts to access an application or uses an application that has not been granted the assignment of priority bandwidth allocation, the mobile device 60 will operate on the artificial limitations placed on mobile device 60 prior to the determination of the assignment of priority bandwidth allocation.

Figure 3:
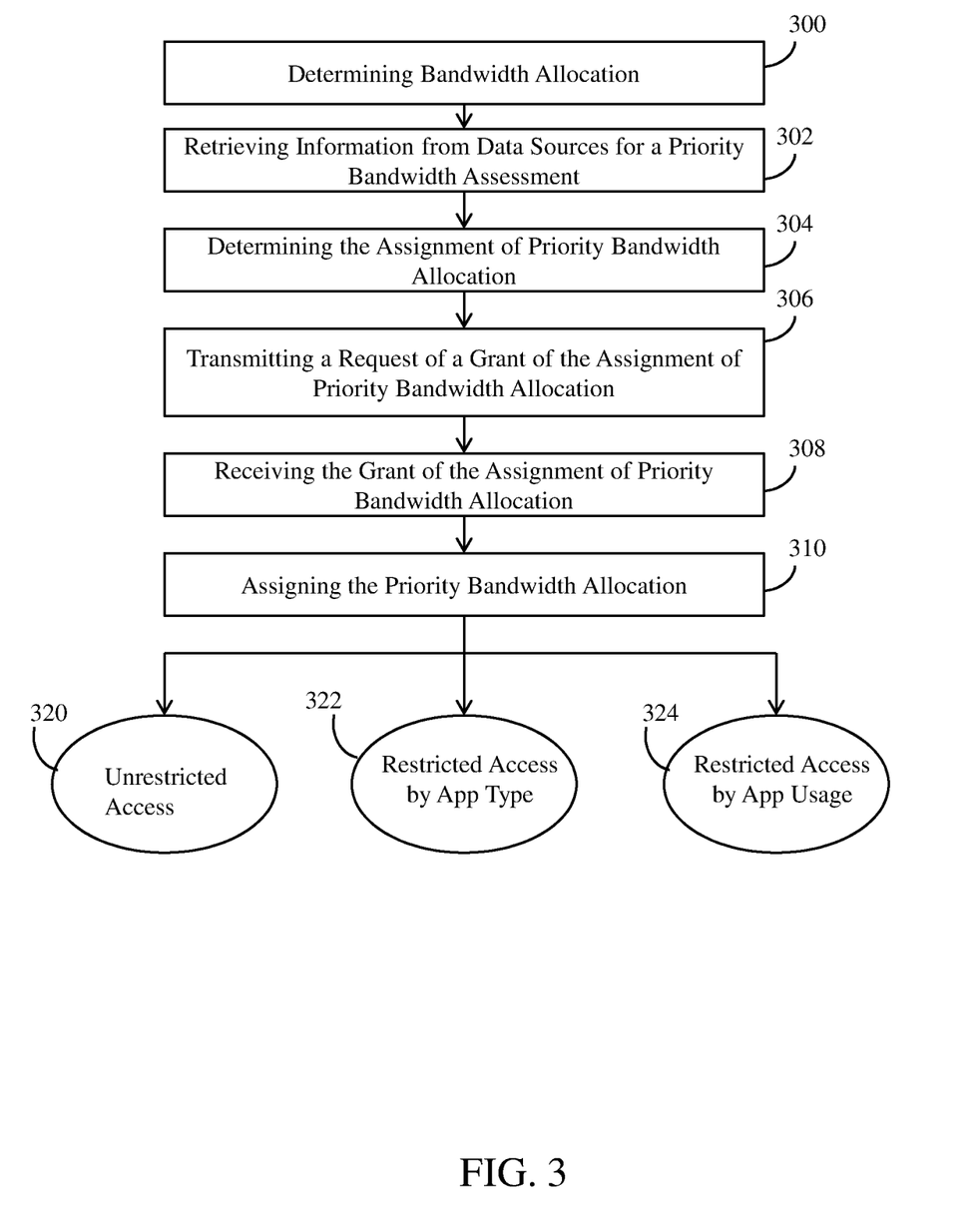
FIG. 3 shows a flowchart of steps of a method in accordance with aspects of the invention.

FIG. 3 shows a flowchart of steps of a method in accordance with aspects of the invention. The steps of the method may be performed in the system of FIG. 2 and are described with reference to the elements and steps described in FIG. 2.

At step 300, the mobile device 60 determines usage of a bandwidth allocation crosses a threshold. In embodiments, as described with respect to FIG. 2, the bandwidth allocation determining module 80 determines usage of the bandwidth allocation of the mobile device 60 crosses the threshold and determines the availability of a faster or less congested network for the mobile device 60. Sources for determining the crossing of the threshold and the availability of networks include: the subscriber plan of the network subscriber, the data usage of the network subscriber, availability of data networks of network providers other than the network provider of the network subscriber, availability of data networks at the location of the network subscriber, and bandwidth availability of the data networks in the location of the network subscriber.

At step 302, the mobile device 60 retrieves information from the data sources on the mobile device 60 and data sources external to the mobile device 60. In embodiments, as described with respect to FIG. 2, the information retrieving module 82 retrieves information from the data sources 70, 72, 74, 76 and retrieves information from the external data servers 92*a-n* based on at least one of: the bandwidth allocation crossing the threshold, and the availability of a faster or less congested network. In aspects, step 302 may include enabling a priority bandwidth assessment of the information from the data sources 70, 72, 74, 76 and the external data servers 92a-n to determine that the situation of the network subscriber warrants an assignment of priority bandwidth allocation to the mobile device 60.

At step 304, the mobile device 60 determines an assignment of priority bandwidth allocation based on an analysis of the priority bandwidth assessment of the information from the data sources. In embodiments, as described with respect to FIG. 2, the analysis module 84 analyzes the information from the data sources 70, 72, 74, 76 and the external data servers 92a-n to determine the mobile device 60 of the network subscriber warrants an assignment of priority bandwidth allocation.

In aspects, as described with respect to FIG. 2, the analysis module 84 performs a cognitive analysis of the information from at least one of the data source 70, 72, 74, 76 and/or at least one of the external data servers 92a-n. The cognitive analysis includes at least one of: natural language processing, relationship extraction processing, tone analysis processing, and visual recognition processing. In aspects, as described with respect to FIG. 2, the analysis module 84 generates an insight, confidence level of the insight, and severity levels of the insight of the situation of the network subscriber that warrants the assignment of priority bandwidth allocation.

At step 306, the mobile device 60 transmits a request for the grant of the assignment of priority bandwidth allocation to the service provider server 102. In embodiments, as described with respect to FIG. 2, the priority bandwidth assessment module 64 transmits a request for the grant of the assignment of priority bandwidth allocation along with the insight, the confidence level of the insight, and the severity level of the insight to the service provider server 102. In aspects, as described with respect to FIG. 2, the priority bandwidth assessment 64 determines the grant of assignment of priority bandwidth allocation to the mobile device 60 based on at least one of: unrestricted access, restricted access by application type, and restricted access by application usage.

In aspects, as described with respect to FIG. 2, the priority determiner module 104 within the service provider server 102 analyzes the request for the grant to determine the grant of the assignment of priority bandwidth allocation. In aspects, as described with respect to FIG. 2, the priority determiner module 104 determines the grant of the assignment based on applying algorithmic rules to the insight, the confidence level of the insight, and the severity level to determine the grant of the assignment and the length of the assignment.

At step 308, the mobile device 60 receives the grant of the assignment of priority bandwidth allocation from the service provider server 102. In embodiments, as described with respect to FIG. 2, the assignment module 86 receives the grant of the assignment of priority bandwidth allocation from the service provider server 102.

At step 310, the mobile device 60 assigns the priority bandwidth allocation. In embodiments, as described with respect to FIG. 2, the assignment module 86 assigns the priority bandwidth allocation to the mobile device 60 based on receiving the grant of the assignment of priority bandwidth allocation from the service provider server 102. In aspects, as described with respect to FIG. 2, the priority bandwidth allocation module 64 regulates the assignment of priority bandwidth allocation to the mobile device 60 and assigns at least one of: unrestricted access to the mobile device 60 at step 320, restricted access by application type to the mobile device 60 at step 322, and restricted access by application usage to the mobile device 60 at step 324.

In embodiments, a service provider could offer to perform the processes described herein. In this case, the service provider can create, maintain, deploy, support, etc., the computer infrastructure that performs the process steps of the invention for one or more customers. These customers may be, for example, any business that requires the management of network priority bandwidth improvements to mobile devices. In return, the service provider can receive payment from the customer(s) under a subscription and/or fee agreement and/or the service provider can receive payment from the sale of advertising content to one or more third parties.

In still another embodiment, the invention provides a computer-implemented method. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a non-transitory computer readable storage medium having program instructions embodied therewith, the program instructions executable by a mobile computer device to cause the mobile computer device to:

determine a bandwidth allocation of the mobile computer device crosses a threshold based on a subscriber plan of a network subscriber of the mobile computer device and data usage of the network subscriber;

in response to the determining the bandwidth allocation of the mobile computer device crosses the threshold, retrieve information from both internal data sources internal to the mobile computer device and external data sources external to the mobile computer device;

analyze the information;

generate, based on the analyzing, an insight, a confidence level of the insight, and a severity level of the insight;

transmit, based on the generating, a request to service provider server of the network subscriber, wherein the request includes: a request for a grant of assignment of priority bandwidth allocation; the insight; the confidence level of the insight; and the severity level of the insight;

receive, from the service provider server, the grant of assignment of priority bandwidth allocation, including a determined length of time of the grant of assignment of priority bandwidth allocation; and assign, based on the receiving the grant of assignment of priority bandwidth allocation, the priority bandwidth allocation on the mobile computer device for the determined length of time, wherein the internal data sources comprise: SMS messages received or sent by the mobile computer device; email messages received or sent by the mobile computer device; a contact list of the network subscriber stored on the mobile computer device; and photos including pictures taken by and stored on the mobile computer device; and the external data sources comprise: a news data server; a traffic data server; a weather data server; and a social network data server.

2. The computer program product of claim 1, wherein the program instructions cause the mobile computer device to determine availability of another network, of another network provider other than a network provider of the network subscriber of the mobile computer device, based on the bandwidth allocation of the mobile computer device crossing the threshold, wherein sources for the determining availability of another network comprise at least one selected from the group consisting of: availability of data networks of network providers other than the network provider of the network subscriber; availability of data networks at a location of the network subscriber; and bandwidth availability and speeds of the data networks in the location of the network subscriber.

3. The computer program product of claim 1, wherein the analyzing the information comprises at least one selected from the group consisting of: relationship extraction processing; tone analysis processing; and visual recognition processing.

4. The computer program product of claim 1, wherein the grant of assignment of priority bandwidth allocation comprises one of: unrestricted access; restricted access by application type; and restricted access by application usage.

5. The computer program product of claim 1, wherein the information from the data sources relates to a medical emergency.

6. The computer program product of claim 1, wherein the assigning the priority bandwidth allocation comprises unrestricted access to a faster network for all applications on the mobile computer device for the determined length of time.

7. The computer program product of claim 1, wherein the assigning the priority bandwidth allocation comprises restricted access to additional bandwidth for a specific application on the mobile computer device for the determined length of time.

8. The computer program product of claim 1, wherein the assigning the priority bandwidth allocation comprises restricted access to a faster network for a specific application on the mobile computer device for the determined length of time.

9. The computer program product of claim 1, wherein the assigning the priority bandwidth allocation comprises a specific usage of a specific application on the mobile computer device for the determined length of time.

10. The computer program product of claim 1, wherein:
the insight relates to a medical emergency of a family member of the network subscriber; and
the assigning the priority bandwidth allocation comprises restricted access to additional bandwidth to use a video chat application, but not other online applications, of the mobile computer device for the determined length of time.

* * * * *